(12) United States Patent
Hsu

(10) Patent No.: US 11,300,311 B2
(45) Date of Patent: Apr. 12, 2022

(54) HUMIDITY INDICATING APPARATUS FOR DEHUMIDIFIER

(71) Applicant: Tsang-Hung Hsu, Tainan (TW)

(72) Inventor: Tsang-Hung Hsu, Tainan (TW)

( * ) Notice: Subject to any disclaimer, the term of this patent is extended or adjusted under 35 U.S.C. 154(b) by 295 days.

(21) Appl. No.: 16/731,324

(22) Filed: Dec. 31, 2019

(65) Prior Publication Data

US 2021/0199331 A1    Jul. 1, 2021

(51) Int. Cl.
| | |
|---|---|
| *G01N 21/81* | (2006.01) |
| *F24F 11/52* | (2018.01) |
| *F24F 3/14* | (2006.01) |
| *B01D 53/26* | (2006.01) |

(52) U.S. Cl.
CPC ............ *F24F 11/52* (2018.01); *B01D 53/261* (2013.01); *F24F 3/1429* (2013.01); *G01N 21/81* (2013.01); *F24F 2003/144* (2013.01); *F24F 2003/1458* (2013.01); *F25B 2700/02* (2013.01)

(58) Field of Classification Search
CPC .... F25B 2700/02; G01N 21/81; G01N 31/222
See application file for complete search history.

(56) References Cited

U.S. PATENT DOCUMENTS

| | | | | |
|---|---|---|---|---|
| 3,142,287 | A * | 7/1964 | Jones ................... | G01N 31/222 116/206 |
| 5,852,937 | A * | 12/1998 | Westermeyer ........ | F25B 41/006 62/125 |
| 2006/0222791 | A1* | 10/2006 | Hsu ........................ | F24F 3/1411 428/34.4 |
| 2008/0128926 | A1* | 6/2008 | Hsu ........................... | F24F 6/02 261/81 |
| 2013/0186189 | A1* | 7/2013 | Fuhrmann ............. | F25B 41/006 73/73 |
| 2014/0374082 | A1* | 12/2014 | Pena ....................... | F24F 3/1411 165/222 |

* cited by examiner

*Primary Examiner* — Jonathan Bradford
(74) *Attorney, Agent, or Firm* — Rosenberg, Klein & Lee

(57) ABSTRACT

The present invention discloses a humidity indicating apparatus for a dehumidifier which includes a housing, a cavity, a transparent separation plate disposed in the cavity for dividing the cavity into a storage space and a thermal insulating space and a color-changing humidity sensor, wherein the housing has a transparent observation window corresponding to the thermal insulating space and a venting aperture corresponding to the storage space, and wherein the storage space stores the color-changing humidity sensor.

7 Claims, 5 Drawing Sheets

HUMIDITY INDICATING APPARATUS FOR DEHUMIDIFIER

BACKGROUND OF THE INVENTION

1. Field of the Invention

The present invention relates to a humidity indicating apparatus for a dehumidifier which reveals a moisture state of the dehumidifier by changing color.

2. Description of Related Art

Mold is a widely found fungus in the nature and is easy to breed in a poorly ventilated and humid environment. In the poorly ventilated and humid environment, foods, clothes and furniture are prone to mold growth which also affects human health. A dehumidifier is then developed to reduce and maintain a level of humidity in the environment so as to reduce growth of molds.

Two types of dehumidifier are mainly provided nowadays. The first type of dehumidifier is a condensate dehumidifier which is powered by electricity and has a large volume. The condensate dehumidifier is not easy to move and is suitable to control a level of humidity of a large space. The second type of dehumidifier is a desiccant dehumidifier which is designed for a small space. The desiccant dehumidifier bonds water molecules in the air with a hydrophilic chemical substance such as calcium chloride, and the common desiccant dehumidifier includes food desiccant or closet dehumidifier box. However, the desiccant dehumidifier is inconvenient since the hydrophilic chemical substance in the desiccant dehumidifier is consumed after bonding water molecules in the air and needs to be refilled. In another type of desiccant dehumidifier, a two-layered box is provided in which the hydrophilic chemical substance such as calcium chloride is disposed in the top layer thereof and the water molecules absorbed by the calcium chloride transform into a fluid to be collected in the bottom layer thereof. The fluid collected in the bottom layer contains the hydrophilic chemical substance such as calcium chloride which is irritating to human skin and causes inflammation, swelling and pain of the human skin. If the fluid is spilled out on an object, the fluid is not easy to clean. In addition, the fluid containing calcium chloride is usually dumped into the drainage system which causes serious environmental pollution.

To improve the disadvantages of the desiccant dehumidifiers, a reusable desiccant dehumidifier is developed. The reusable desiccant dehumidifier comprises a housing, an electrothermal component and a plurality of hydroscopic granules disposed in the housing in which each of the hydroscopic granules has a diameter ranging from 2 mm to 3 mm After the hydroscopic granules are saturated with water molecules, the electrothermal component is turned on to heat and dry the saturated hydroscopic granules. Therefore, the dried hydroscopic granules can adsorb water molecules in the air after heated so as to achieve a purpose of reuse.

For estimating a moisture state of the hydroscopic granules, a humidity indicating apparatus is installed on the reusable desiccant dehumidifier. The humidity indicating apparatus comprises colored humidity sensor having a color-changing humidity sensing material disposed in a cavity thereof. The cavity is communicated with the hydroscopic granules in the housing of the reusable desiccant dehumidifier by plural through holes of a wall of the cavity. The color-changing humidity sensing material of the colored humidity sensor detects a moisture state of the hydroscopic granules and changes its color as an increasing of the moisture state. Therefore, the moisture state of the hydroscopic granules is evaluated according to the color of the humidity indicating apparatus by a user to determine whether the hydroscopic granules of the reusable desiccant dehumidifier needs to be dried.

When the reusable desiccant dehumidifier is heated and dried to remove water molecules adsorbed by the hydroscopic granules, condensed water droplets are formed since a temperature of the environment is lower than a temperature of the cavity directly contacted to the environment. The color-changing humidity sensing material is then immersed in the condensed water droplets and is washed away. After the color-changing humidity sensing material is washed away, the humidity indicating apparatus cannot change color thereof to reveal the moisture state of the hydroscopic granules anymore and the user cannot estimate the moisture state and determine whether the hydroscopic granules needs to be dried.

SUMMARY OF THE INVENTION

The present invention discloses a humidity indicating apparatus for a dehumidifier which prolongs a use life of a color-changing humidity sensor of the present invention.

The humidity indicating apparatus for a dehumidifier of the present invention comprises a housing, a transparent separation plate and at least one color-changing humidity sensor. The color-changing humidity sensor is shaped as a plurality of pieces, a plurality of granules or a block. The housing comprises a top member, a bottom member, a lateral wall and a cavity. The lateral wall is disposed between the top member and the bottom member and the cavity is defined by the top member, the bottom member and the lateral wall. The top member has a transparent observation window. The housing further has at least one venting aperture which is communicated with an internal region of a dehumidifier. The transparent separation plate is disposed in the cavity for dividing the cavity into a storage space and a thermal insulation space. The thermal insulation space is correspondingly located next to the transparent observation window. The storage space is communicated with the at least one venting aperture. The color-changing humidity sensor is disposed in the storage space.

In an embodiment of the present invention, the lateral wall has a rim protruded from one side facing to the cavity for supporting the transparent separation plate.

In an embodiment of the present invention, the housing has a front casing and a back casing. The front casing comprises the top member and the lateral wall, and the lateral wall is connected to an edge of the top member. The back casing comprises the bottom member. The housing further comprises a locking member disposed between the front casing and the back casing for fastening the front casing and back casing to each other.

In an embodiment of the present invention, the at least one venting aperture is at least one gap formed between the front casing and the back casing, or at least one through hole disposed at the bottom member of the back casing.

In an embodiment of the present invention, the locking member comprises at least two protruding ribs disposed on the lateral wall of the front casing and at least two ear pieces extended from the back casing and corresponding to the two protruding ribs. Each of the two ear pieces has a slot for engaging with each of the two protruding ribs.

In an embodiment of the present invention, two sides of each of the two protruding ribs are further provided with two positioning members, and a distance between the two positioning members is adapted to a width of each of the two ear pieces.

Accordingly, the advantages of the present invention include:

1. The cavity of the present invention is divided into the storage space and the thermal insulation space by the transparent separation plate. When the dehumidifier is heated to dry the hydroscopic material thereof, a temperature of the storage space will not be decreased rapidly since the storage space is insulated from an outer environment having a lower temperature by the thermal insulation space. Water molecules evaporated from the hydroscopic material of the dehumidifier and the color-changing humidity sensor of the present invention are not easy to condense into water droplets in the storage space, and the color-changing humidity sensor is not easily washed away by the condensed water droplets. Therefore, the present invention prolongs the use life of the color-changing humidity sensor.

2. The front casing and the back casing of the present invention are fastened by engaging the protruding ribs with the slots of the ear pieces which is easy to disassemble, so it is convenient to replace the color-changing humidity sensor of the present invention.

DETAILED DESCRIPTION OF THE PREFERRED EMBODIMENT

Figure 1:
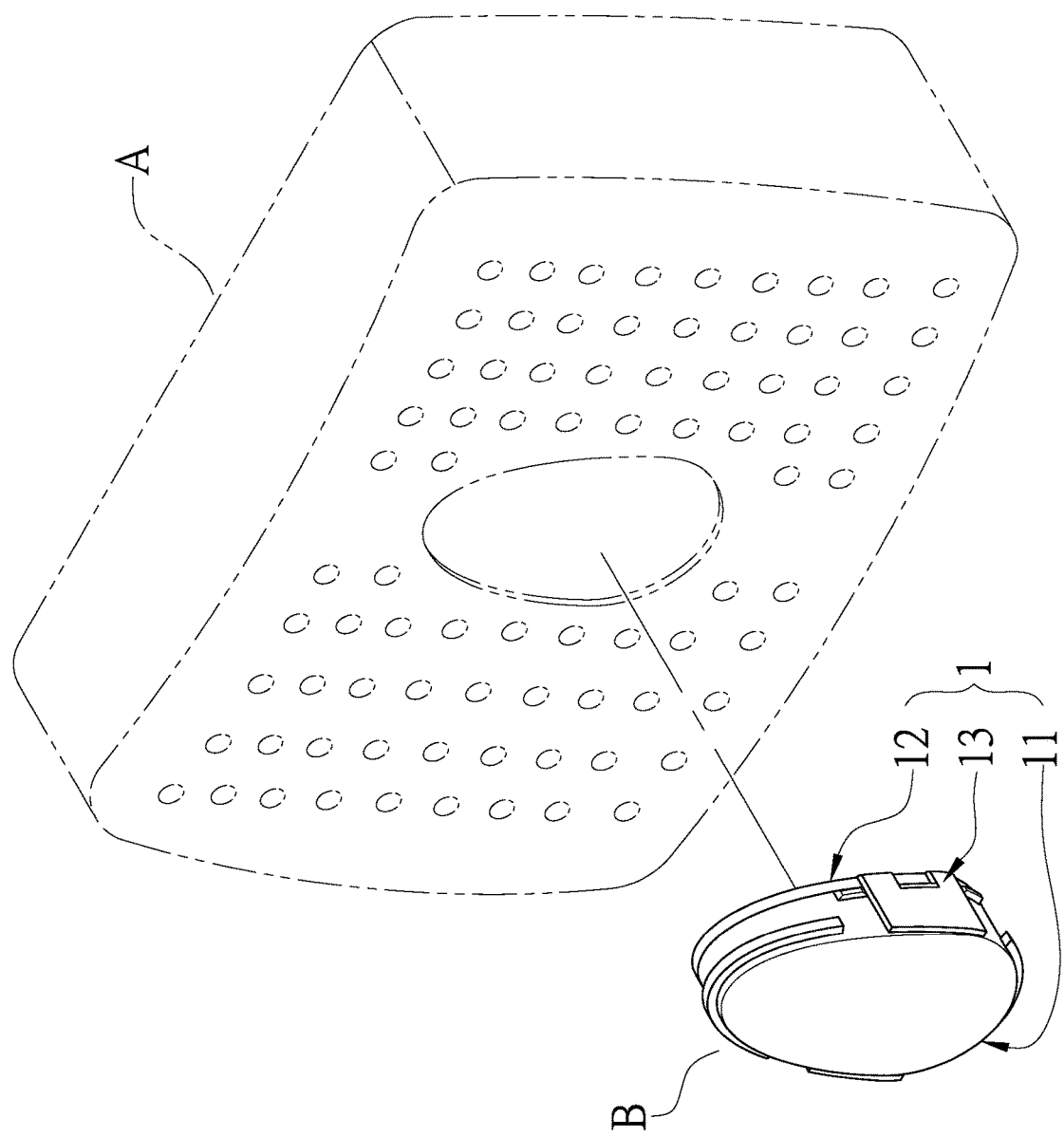
FIG. 1 is a schematic diagram showing a humidity indicating apparatus of the present invention installed on a dehumidifier.
Figure 2:
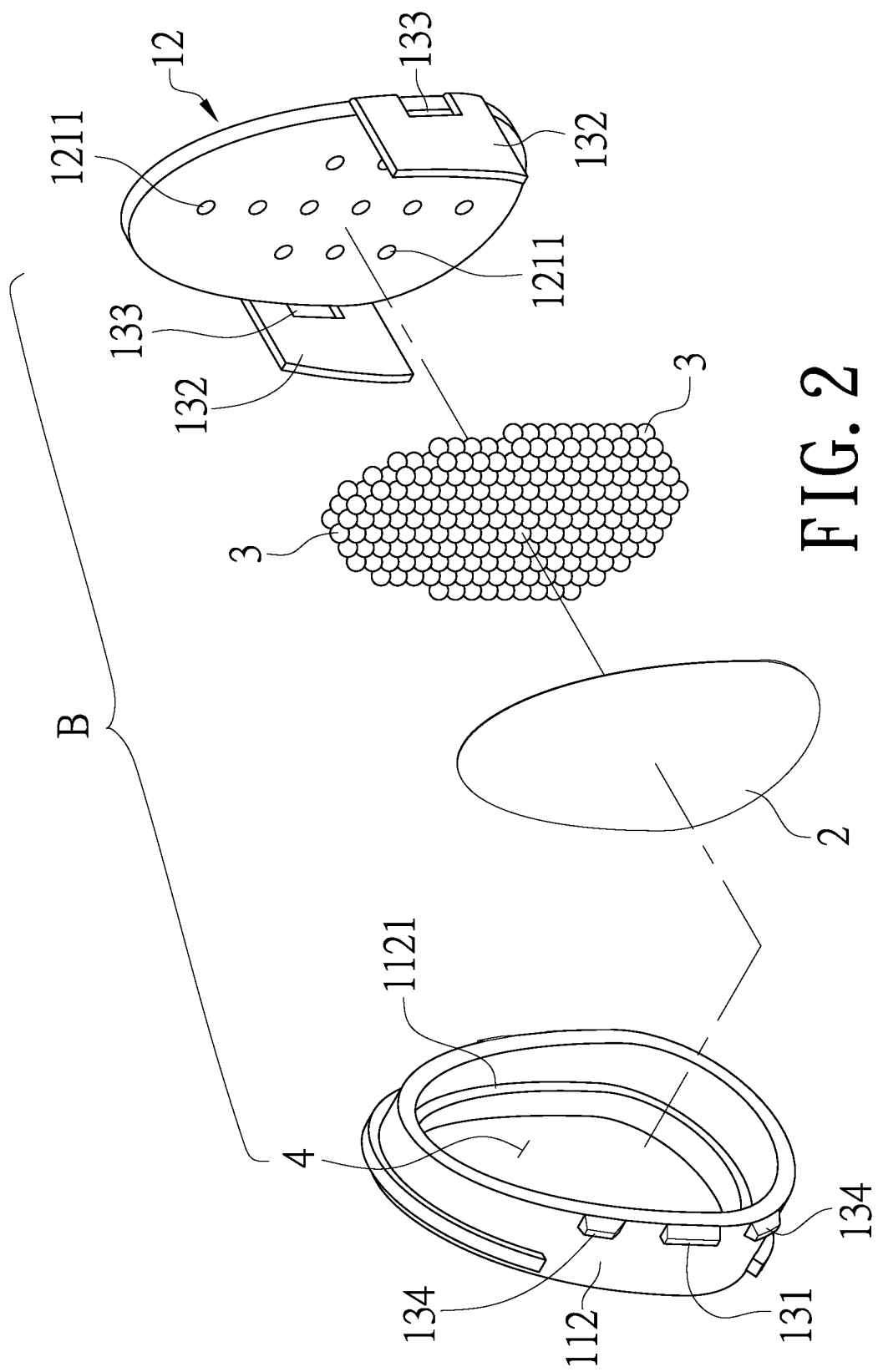
FIG. 2 is an exploded diagram showing a humidity indicating apparatus for a dehumidifier of the present invention.
Figure 3:
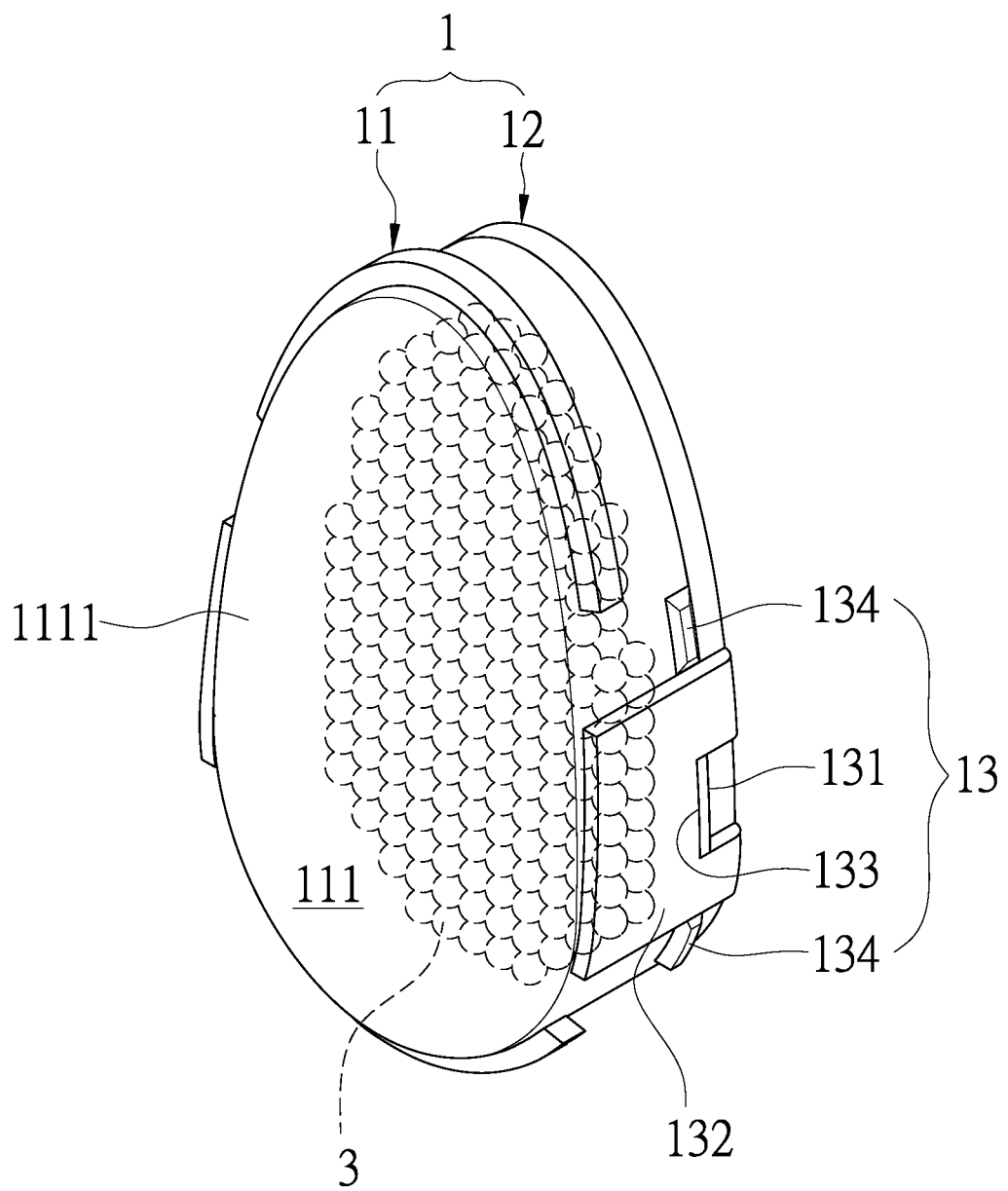
FIG. 3 is a perspective diagram showing a humidity indicating apparatus for a dehumidifier of the present invention.

Referring to FIG. 1 to FIG. 3, a humidity indicating apparatus (B) of the present invention is installed on a case of a dehumidifier (A). The humidity indicating apparatus (B) of the present invention comprises a housing (1), a transparent separation plate (2) and at least one color-changing humidity sensor (3) shaped as a plurality of pieces, a plurality of granules or a block.

The housing (1) comprises a front casing (11) and a back casing (12). The front casing (11) comprises a top member (111) and a lateral wall (112) connected to the top member (111). The back casing (12) comprises a bottom member (121). Preferably, a locking member (13) is disposed between the front casing (11) and the back casing (12), and the front casing (11) and the back casing (12) are fastened to each other by the locking member (13). After the front casing (11) and the back casing (12) are fastened to each other, a cavity (4) is defined by the top member (111), the lateral wall (112) and the bottom member (121). The top member (111) of the front casing (11) has a transparent observation window (1111), and at least one gap formed between the front casing (11) and the back casing (12) is defined as at least one venting aperture (1211). In addition, at least one through hole is also disposed at the bottom member (121) of the back casing (12) as the at least one venting aperture (1211). The humidity indicating apparatus (B) of the present invention is communicated to an internal space of the humidifier (A) by the at least one venting aperture (1211). The transparent separation plate (2) is disposed in the cavity (4) to divide the cavity (4) into a storage space (41) and a thermal insulation space (42). The thermal insulation space (42) is correspondingly located next to the transparent observation window (1111), and the storage space (41) is communicated with the at least one venting aperture (1211). The at least one color-changing humidity sensor (3) is shaped as a plurality of granule, a plurality of pieces or a block and disposed in the storage space (41).

Figure 4:
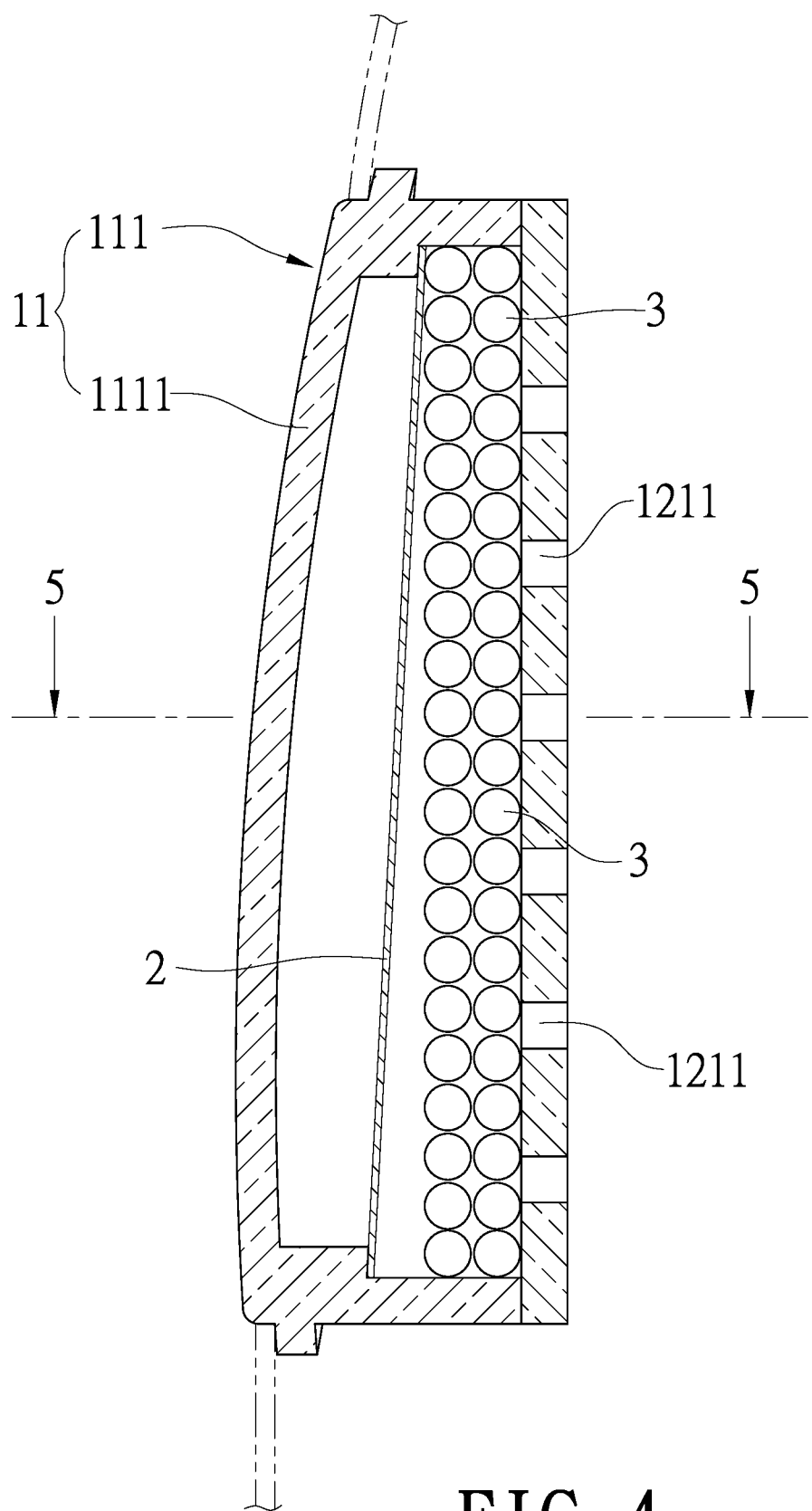
FIG. 4 is a longitudinal sectional diagram of the FIG. 3 showing a humidity indicating apparatus for a dehumidifier of the present invention.
Figure 5:
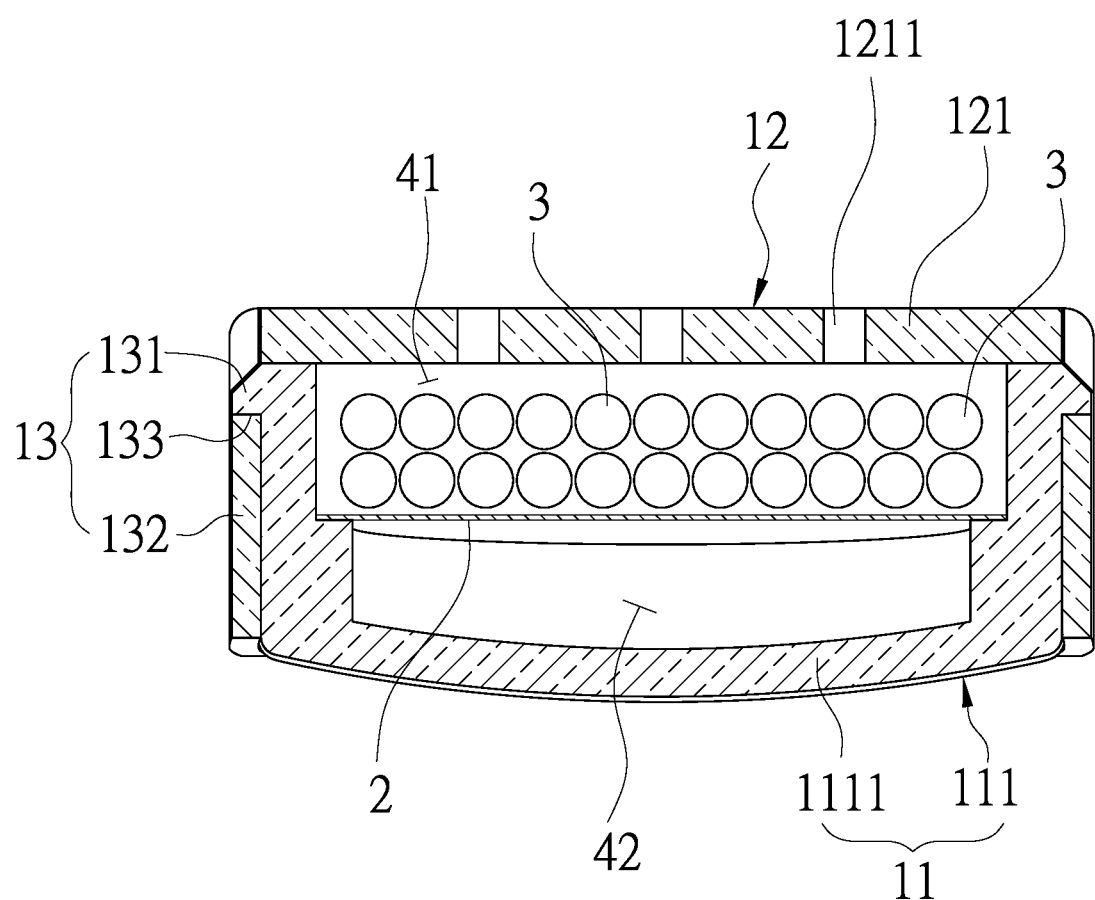
FIG. 5 is a cross sectional diagram of the FIG. 4 showing a humidity indicating apparatus for a dehumidifier of the present invention.

Referring to FIG. 4 and FIG. 5, in a preferred embodiment, the lateral wall (112) of the front casing (11) has a rim (1121) protruded from one side thereof facing to the cavity (4) for supporting the transparent separation plate (2).

Referring to FIG. 2, FIG. 3 and FIG. 5, in a preferred embodiment, the locking member (13) comprises at least two protruding ribs (131) and at least two ear pieces (132). The at least two protruding ribs (131) are disposed on the lateral wall (112) of the front casing (11), and the at least two ear pieces (132) are extended from the back casing (12) and corresponding to the two protruding ribs (131). Each of the two ear pieces (132) has a slot (133) for engaging with each of the two protruding ribs (131) to fasten the front casing (11) and the back casing (12). Therefore, it is convenient to disassemble the front casing (11) and the back casing (12) by disengaging the protruding ribs (131) and the slots (133) of the ear pieces (132).

Furthermore, two sides of each of the two protruding ribs (131) are provided with two positioning members (134), and a distance between the two positioning members (134) is adapted to a width of each of the two ear pieces (132). When assembling the front casing (11) and the back casing (12), a moving rout of each of the two ear pieces (132) is guided and positioned by the two positioning members (134).

The cavity (4) is divided into the storage space (41) and the thermal insulation space (42) by the transparent separation plate (2). When the dehumidifier (A) is heated to dry the hydroscopic material thereof, a temperature of the storage space (41) will not be decreased rapidly since the storage space (41) is insulated from an outer environment having a lower temperature by the thermal insulation space (42). Water molecules evaporated from the hydroscopic material of the dehumidifier (A) and the color-changing humidity sensor (3) in the storage space (41) are not easy to condense into water droplets in the storage space (41), and the color-changing humidity sensor (3) is not easily washed away by the condensed water droplets. Therefore, the present invention ensures sensitivity to humidity and color-changing function of the color-changing humidity sensor (3) and prolongs the use life of the color-changing humidity sensor (3).

What is claimed is:

1. A humidity indicating apparatus for a dehumidifier, comprising:
 a housing having a top member, a bottom member, a lateral wall disposed between the top member and the bottom member, a cavity defined by the top member, the bottom member and the lateral wall, and at least one venting aperture, wherein the top member has a transparent observation window;

a transparent separation plate disposed in the cavity for dividing the cavity into a storage space communicating with the at least one venting aperture and a thermal insulation space correspondingly located next to the transparent observation window; and at least one color-changing humidity sensor disposed in the storage space.

2. The humidity indicating apparatus for a dehumidifier as claimed in claim 1, wherein the lateral wall has a rim protruded from one side thereof facing to the cavity for supporting the transparent separation plate.

3. The humidity indicating apparatus for a dehumidifier as claimed in claim 2, wherein the housing has a front casing comprising the top member and the lateral wall connected to the top member, a back casing comprising the bottom member, and a locking member disposed between the front casing and the back casing for fastening the front casing and back casing to each other.

4. The humidity indicating apparatus for a dehumidifier as claimed in claim 3, wherein the locking member comprises at least two protruding ribs disposed on the lateral wall of the front casing and at least two ear pieces extended from the back casing and corresponding to the two protruding ribs, wherein each of the two ear pieces has a slot for engaging with each of the two protruding ribs.

5. The humidity indicating apparatus for a dehumidifier as claimed in claim 4, wherein two sides of the two protruding ribs are further provided with two positioning members, and wherein a distance between the two positioning members is adapted to a width of each of the two ear pieces.

6. The humidity indicating apparatus for a dehumidifier as claimed in claim 3, wherein the at least one venting aperture is at least one gap formed between the front casing and the back casing.

7. The humidity indicating apparatus for a dehumidifier as claimed in claim 3, wherein the at least one venting aperture is at least one through hole disposed at the bottom member of the back casing.

* * * * *